United States Patent Office 3,329,669
Patented July 4, 1967

3,329,669
6-BENZOYLBENZOTHIAZOLE MONOAZO DYESTUFFS
Mario F. Sartori, Wilmington, Del., assignor to E. I. du Pont de Nemours and Company, Wilmington, Del., a corporation of Delaware
No Drawing. Filed Mar. 3, 1964, Ser. No. 349,143
4 Claims. (Cl. 260—158)

This application is a continuation-in-part of my copending application Ser. No. 279,023, filed May 8, 1963, and now abandoned.

This invention relates to new and useful monoazo disperse dyes.

Disperse dyes are used chiefly in the dyeing of hydrophobic fibers, particularly those fibers of the polyester type such as polyethylene terephthalate fibers. The dyeing of polyethylene terephthalate fibers presents problems that are not encountered with other synthetic textile materials such as acid-modified hydrophobic fibers which contain acid sites to which cationic-type dyes become attached in the dyeing process. On the other hand, unmodified polyethylene terephthalate fibers are dyed by a solid solution mechanism wherein a disperse dye is dissolved in the fiber. Disperse dyes generally should possess good lightfastness, brightness, and high tinctorial strength, and good exhaust and level dyeing properties. Moreover, in order for a disperse dye to enter into a solid solution with a fiber, it is essential that the dye molecule should be relatively small to insure adequate mobility in the dyeing process. On the other hand, these requirements of mobility and small molecular size also have a disadvantage in that they permit the dye to escape from the fiber upon application of heat, such as when a polyethylene terephthalate fabric is pressed with a hot iron. In many instances, when heat is applied to a polyethylene terephthalate containing a disperse dye, the dye will sublime out of the fiber at the elevated temperature. This results not only in a loss of color, but in addition, the sublimed dye has a tendency to stain adjacent fibers either in the same piece of fabric or in fabrics which are in contact therewith. Several undesirable effects result from this sublimation. For instance, a disperse dye applied in self shade will show streaks; fabrics containing both dyed and undyed fibers will show staining of the undyed fiber; and also, a fabric composed of fibers which were dyed in different shades prior to weaving will be stained if one of the fibers contains a disperse dye which is subject to sublimation.

The present invention provides new 6-acyl-2-benzothiazolylazo disperse dyes having yellow to violet shades. These dyes exhibit outstanding brightness and sublimation fastness, good lightfastness, high tinctorial strength, and good exhaust and level dyeing properties.

The dyes of this invention have the formula:

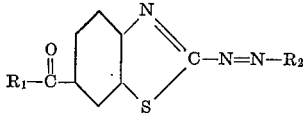

wherein $R_1$ is selected from the group consisting of $C_1$–$C_4$ alkyl, cyclohexyl radicals and phenyl radicals which may be substituted with Cl, Br, $NO_2$ and $C_1$–$C_4$ alkyl; $R_2$ is a radical of an azo coupling component selected from the group consisting of a phenol, naphthol, enol, an aromatic amine of the benzene series, an aromatic amine of the naphthalene series, an indole, and heterocyclic couplers, said $R_2$ radical being free of ionogenic water-solubilizing groups. Dyes of the above formula where $R_1$ is phenyl or substituted phenyl as indicated above are especially suitable in producing level dyeings on polyester fibers when applied by package dyeing methods.

Examples of specific dyes of this invention are the following preferred dyes:

The disperse azo dye of formula

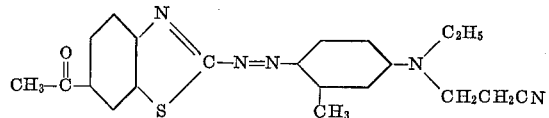

The disperse azo dye of formula

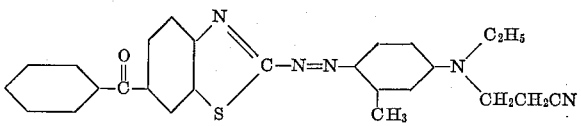

The disperse azo dye of formula

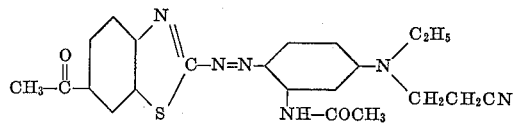

The disperse azo dye of formula

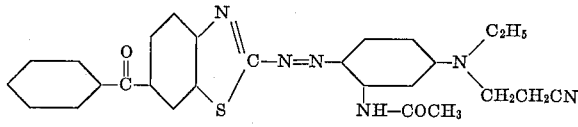

The disperse azo dye of formula

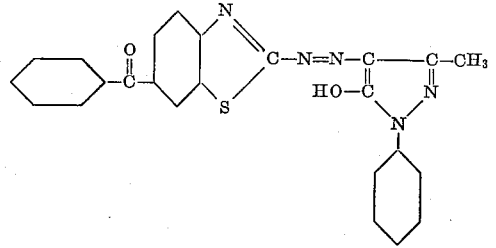

A preferred class of dyes coming within this invention are those having the formula

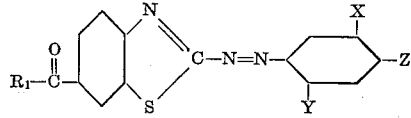

wherein
$R_1$ is selected from the group consisting of $C_1$–$C_4$ alkyl, phenyl, tolyl, and cyclohexyl radicals;
X is selected from the group consisting of H, Cl, $OCH_3$, and $OC_2H_5$;
Y is selected from the group consisting of H, Cl, Br, $CH_3$, $C_2H_5$, $OCH_3$, $OC_2H_5$, NHCO-alkyl, $NHSO_2$-alkyl,

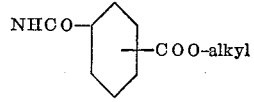

NHCO-penyl, and $NHSO_2$-phenyl, in which said phenyl radicals may be substituted by Cl, $NO_2$, CN, $OCH_3$, phenyl or alkyl, and wherein the alkyls contain 1–4 C-atoms;
Z is selected from the group consisting of morpholine, thiomorpholine, thiomorpholine-dioxide and —$N(R_3)R_4$ where
$R_3$ is selected from the group consisting of H, $C_1$–$C_4$ alkyl, $C_2$–$C_4$ hydroxyalkyl, 2-cyanoethyl, alkoxyalkyl having 3 to 4 C-atoms, 2-acetoxyethyl, and 2-benzoyloxyethyl; and
$R_4$ is selected from the group consisting of H, $C_1$–$C_4$ alkyl, $C_2$–$C_4$ hydroxyalkyl, 2-cyanoethyl, alkoxyalkyl havng 3 to 4 C-atoms, 2-acetoxyethyl, 2-benzoyloxyethyl, phenyl, tolyl, and substituted 2-benzoyloxyethyl in which the benzoyl radical may be substituted by a radical selected from the group consisting of Cl, $NO_2$, CN, $OCH_3$, phenyl, $C_1-C_4$ alkyl, and COO-alkyl wherein said ester alkyl contains 1 to 4 C-atoms.

The novel compounds of this invention are prepared by diazotizing the desired 6-acyl-2-aminobenzothiazole, coupling in acid solution to the chosen coupler, and isolating the product by conventional methods. Isolation may be accomplished by precipitating the dye from acid solution by the addition of water, and then filtering, washing, and drying the precipitate.

The 6-acetyl-2-aminobenzothiazole diazo component is prepared as described in Annali di Chimica 45, 172 (1955). The other 6 - acyl - 2-aminobenzothiazoles employed herein are prepared by analogous methods.

The coupling components are prepared by well known methods, basically by alkylation of aniline or its derivatives. The N-hydroxyalkyl aryl amines may be acylated to prepare their ester derivatives, and the N,N-di(2-hydroxyethyl)aryl amino compounds are readily converted to the corresponding N-arylmorpholines. The N-arylthiomorpholines are prepared by reacting primary aryl amines with di(2-chloroethyl) sulfide. The N-arylthiomorpholinedioxides are prepared by reacting primary aryl amines with di(2-chloroethyl)sulfone.

For a clearer understanding of the invention, the following specific examples are given. These examples are intended to be merely illustrative of the invention and not in limitation thereof. Unless otherwise specified, all parts are by weight.

*Example 1*

A solution of 1.9 parts of 6-acetyl-2-aminobenzothiazole [prepared as described in Annali di Chimica 45, 172 (1955)] in 34 parts of 85% phosphoric acid is cooled to —5° C. A solution of 0.7 part of sodium nitrite in 10 parts of water is added slowly to the agitated solution, and the resulting mixture is stirred at —5° C. for 2 hours. The diazotization mixture is then added to a cold (—5° C.) solution of 1.88 parts of N-2-cyanoethyl-N-ethyl-m-toluidine in 10 parts of 10% hydrochloric acid. After stirring 2 hours at —5° C., 100 parts of water are added to precipitate the die, which is filtered off, washed acid-free, and dried. The new dye is a dark red powder and has the formula

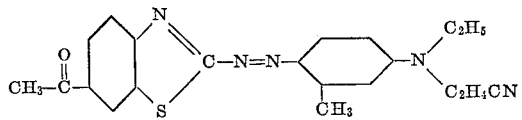

*Analysis.*—Calculated for $C_{21}H_{21}N_5OS$: C, 64.2; H, 5.3; N,17.8. Found: C, 63.4; H, 5.3; N, 17.9.

The absorption maximum of this dye in acetone is located at 520 millimicrons, and its molar extinction coefficient in acetone is 54,000. A fabric of "Dacron" polyester fiber dyed with the new dye has a bright red shade of good light- and sublimation-fastness.

*Example 2*

When the 1.88 parts of N-2-cyanoethyl-N-ethyl-m-toluidine used in Example 1 are replaced by 1.6 parts of N-2-cyanoethyl-N-methylaniline, a red-scarlet disperse dye having similar properties to those of the dye of Example 1 is obtained. The absorption maximum of this N-methyl analog in orthodichlorobenzene is located at 500 millimicrons, and its molar extinction coefficient in the same solvent is 36,000.

*Example 3*

1.9 parts of 6-acetyl-2-aminobenzothiazole are diazotized in 85% phosphoric acid, and coupled to 2.7 parts of N-(2-benzoyloxyethyl)-N-ethylaniline in dilute hydrochloric acid according to the procedure described in Example 1. The new dye, obtained as a dark red powder, has the formula

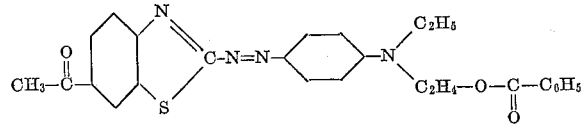

The absorption maximum of this dye in monochlorobenzene is located at 510 millimicrons, and its molar extinction coefficient in this solvent is 45,000. It dyes polyethylene terephthalate fiber in bright red shades of good light- and sublimation-fastness.

*Example 4*

(a) 1.9 parts of 6-acetyl-2-aminobenzothiazole are diazotized as described in Example 1. The diazotization mixture is added to a solution of 2.1 parts of N-phenylthiomorpholinedioxide in 10 parts of 85% phosphoric acid at —5° C. After stirring the coupling mixture for 2 hours at —5° C. to 0° C., 100 parts of water are added. The resulting dye is filtered off, washed acid-free, and dried. The new dye has the formula

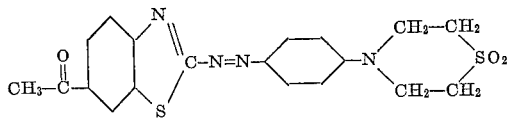

Its absorption maximum in orthodichlorobenzene is located at 460 millimicrons, and the molar extinction coefficient in this solvent is 35,000. When applied to polyester fibers, the new dye exhibits bright orange shades having very good fastness properties.

(b) When the N-phenylthiomorpholinedioxide coupler used in part (a) of this example is replaced by a chemical equivalent amount of N-methyl-N-phenylaniline, a bluish red dye having a molar extinction coefficient in orthodichlorobenzene of 39,000 is obtained. Its absorption maximum in orthodichlorobenzene is located at 520 millimicrons.

*Example 5*

(a) 2.5 parts of 2-amino-6-benzoylbenzothiazole are diazotized and the diazonium compound obtained is coupled with 1.6 parts of N,N-diethyl-m-toluidine. Diazotization, coupling and isolation of the dye formed are carried out as described in Example 1. This compound has the structure:

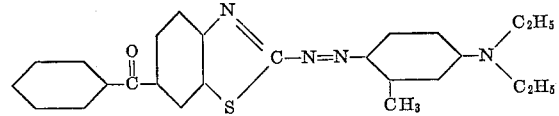

It dyes polyester fiber bright red shades of high tinctorial value and good fastness properties.

(b) When the N,N-diethyl-m-toluidine coupler used in part (a) of this example is replaced by a chemical equivalent amount of N-ethyl-N-cyanoethyl-m-toluidine, a red dye having a molar extinction coefficient in acetone of 50,000 is obtained. Its absorption maximum in acetone is located at 520 millimicrons. This dye has the structural formula:

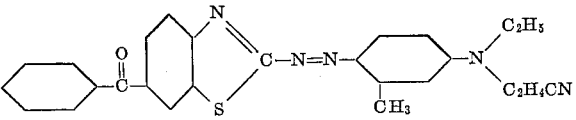

This dye exhibits uniform dyeings when applied to polyester fibers by low-volume exhaust applications, as in package dyeings.

(c) 2-amino - 6 - benzoylbenzothiazole, melting point 254° C., employed in this example was prepared from p-aminobenzophenone by following a method similar to that used for the preparation of 6-acetyl-2-aminobenzothiazole (see Example 1).

Example 6

(a) 1.9 parts of 6-acetyl-2-aminobenzothiazole are diazotized as described in Example 1. The diazotization mixture is added to a solution of 1.8 parts of acetoacetanilide in methanol at 0° C. After stirring for 2 hours at —5° C. to 10° C., the resulting dye is filtered off, washed acid-free and dried. The new dye has the formula:

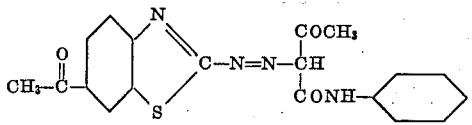

(b) 2.5 parts of 2-amino-6-benzoylbenzothiazole are diazotized by following the procedure described in Example 1. The diazotization mixture is added to a solution of 1.8 parts of acetoacetanilide in methanol at 0° C. After stirring for 2 hours at —5 to 10° C., the resulting dye is filtered off, washed acid-free, and dried. The new dye has the formula:

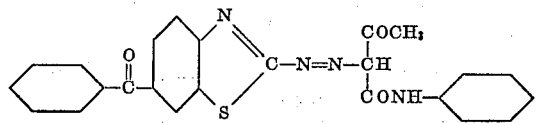

When applied to polyester fibers, the dyes of this Example exhibit yellow shades having good dyeing and fastness properties.

Dyes of similar properties are obtained when in either (a) or (b) of this example the acetoacetanilide is replaced by chemically equivalent amounts of an anilide derivative such as:

o-acetoacetotoluidide
p-acetoacetanisidide
3'-chloro-4'-ethoxyacetoacetanilide
4'-chloro-2',5'-dimethoxyacetoacetanilide
2',4'-acetoacetoxylidide
4'-(2-hydroxyethyl)acetoacetanilide
4,4,4-trifluoroacetoacetanilide
4,4,4-trifluoro-o-acetoacetanisidide
4,4,4-trifluoro-4'-nitroacetoacetanilide or an ester such as ethyl acetoacetate
phenyl acetoacetate
methyl 4,4,4-trifluoroacetoacetate
methyl p-nitrobenzoylacetate or an anilide of cyanoacetic acid such as 2-cyanoacetanilide
2-cyano-p-acetanisidide
2-cyano-4'-nitroacetanilide or of other compounds capable of existing in enol forms such as benzoylacetonitrile
anisoylacetonitrile
4'-(2-benzoylacetamido)-2',5'-dimethoxybenzanilide
cinnamoylacetonitrile
p-nitrocinnamoylacetonitrile
1-naphthoylacetonitrile
N-2-naphthylacetoacetamide
1,3-indanedione
5,6-dichloro-1,3-indanedione
1,3-peri-naphthindanedione of the structure

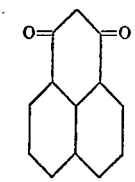

5,5-dimethyl-1,3-cyclohexanedione
barbituric acid (malonylurea)
thiobarbituric acid (malonylthiourea)
2-iminobarbituric acid.

Example 7

1.9 parts of 6-acetyl-2-aminobenzothiazole are diazotized as described in Example 1. The diazotization mixture is added to a solution of 1.1 parts of m-cresol in methanol at —5° C. After stirring 2 hours at —5° to 10° C. the resulting dye is filtered off, washed acid-free and dried. The new dye has the formula:

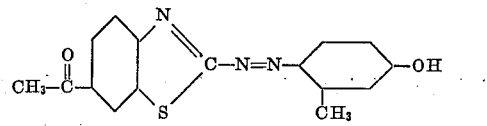

When applied to polyester fibers, this dye exhibits orange shades having good fastness.

Dyes of similar properties are obtained when in this example the m-cresol is replaced by chemically equivalent amounts of other phenols or naphthols or their derivatives which are free of ionogenic water-solubilizing groups such as sulfo or carboxy groups. Such phenolic and naphtholic couplers are illustrated by the following compounds:

p-cresol
m-methoxyphenol
m-chlorophenol
1-naphthol
2-naphthol
4-bromo-1-naphthol
4-methoxy-1-naphthol 3-hydroxy-2-naphthoic acid arylamides such as, 3-hydroxy-2-naphthanilide
3-hydroxy-2-naphtho-o-toluidide
3-hydroxy-2-naphth-o-anisidide
3-hydroxy-2-naphtho-p-toluidide
3-hydroxy-2-naphth-p-anisidide
3-hydroxy-2'-methyl-2-naphth-p-anisidide

Example 8

6-acetyl-2-aminobenzothiazole (1.9 parts) is diazotized as described in Example 1. The diazotized mixture is added to a solution of 1.4 parts of 2-naphthylamine in dilute hydrochloric acid cooled to 0° C. After stirring for 2 hours at —5° to 5° C., the resulting dye is filtered off, washed acid-free and dried. The new dye has the formula:

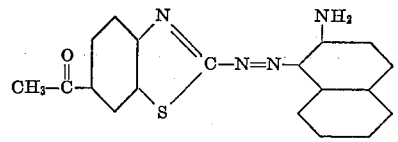

When applied to polyester fibers, this dye gives violet shades of good dyeing and fastness properties.

Dyes of similar characteristics are obtained when in this example 2-naphthylamine is replaced by chemically equivalent amounts of 1-naphthylamine, or of substituted naphthylamines such as:

8-amino-2-naphthol
7-amino-1-naphthol
5-amino-1-naphthol
4-bromo-1-naphthylamine

Example 9

6-acetyl-2-aminobenzothiazole (1.9 parts) is diazotized as described in Example 1. The diazotization mixture is added to a solution of 1.7 parts of 3-methyl-1-phenyl-5-pyrazolone in acetic acid (10 parts) and water (10 parts) at 0° C. After stirring for 2 hours at —5° to +5° C., the resulting dye is filtered off, washed acid-free and dried. The new dye has the formula:

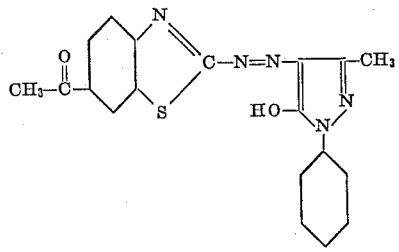

When applied to polyester fibers, this dye gives yellow shades of outstanding fastness properties.

Dyes of similar characteristics are obtained when the methylphenylpyrazolone is replaced in this example by chemically equivalent amounts of other heterocyclic couplers such as:

1-phenyl-5-pyrazolone
3-methyl-5-pyrazolone
3-ethyl-5-pyrazolone
1-phenyl-3-ethoxycarbonyl-5-pyrazolone
1-phenyl-3-butoxycarbonyl-5-pyrazolone
1-phenyl-3-phenoxycarbonyl-5-pyrazolone
1-phenyl-3-carbamoyl-5-pyrazolone
1-phenyl-3-methylcarbamoyl-5-pyrazolone
1-phenyl-3-dimethylcarbamoyl-5-pyrazolone
1-phenyl-3-phenylcarbamoyl-5-pyrazolone
1-phenyl-3-(2-hydroxyethylcarbamoyl)-5-pyrazolone
1-(m-aminophenyl)-3-methyl-5-pyrazolone
1-(p-aminophenyl)-3-methyl-5-pyrazolone
1-(p-aminophenyl)-3-methoxycarbonyl-5-pyrazolone
1-(5-amino-2-chlorophenyl)-3-methyl-5-pyrazolone
1-(4-amino-2-methoxyphenyl)-3-methyl-5-pyrazolone
3-amino-1-phenyl-5-pyrazolone
2-methylindole
5-bromo-2-methylindole
Carbasol-2-ol
3-dibenzofuranol
5-quinolinol
8-quinolinol
5-isoquinolinol
2,4-quinolinediol
1-(m-nitrophenyl)-3-methyl-5-pyrazolone
1-(p-nitrophenyl)-3-methyl-5-pyrazolone
1,2,3,4-tetrahydro-6-methoxyquinoline
1,2,3,4-tetrahydro-7-methylquinoline
1,2,3,4-tetrahydro-1-methylquinoline
1,2,3,4-tetrahydro-1-(2-hydroxyethyl)quinoline
3,4-dihydro-2H-1,4-benzoxazine (benzomorpholine)
4-ethyl-3,4-dihydro-2H-1,4-benzoxiazine
4-(2-cyanoethyl)-3,4-dihydro-2H-1,4-benzoxazine
julolidine
2-acetamidothiophene
2-benzamidothiophene
2-aminothiazole
2-dimethylaminothiazole
2-aminooxazole
6-aminoindazole
indazol-6-ol
5-indenamine

*Example 10*

3.8 parts of 6-acetyl-2-aminobenzothiazole are diazotized as described in Example 1. The diazotization mixture is added to a cold (0° C.) solution of 4.6 parts of 3'-(N-ethyl-N-cyanoethylamino)acetanilide in 20 parts of 10% hydrochloric acid. After stirring 2 hrs. at 0° C., 200 parts of water are added to precipitate the dye, which is filtered off, washed and dried. The new dye is a dark red powder and has the formula

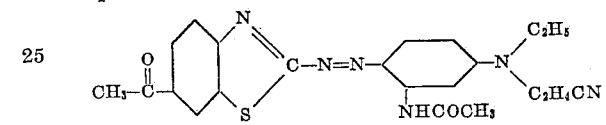

It dyes polyester fiber a bright blue-red shade of high tinctorial value and excellent light and sublimation fastness.

When the 3'-(N-ethyl-N-cyanoethylamino)acetanilide used in this example is replaced by a chemically equivalent amount of 3'-amino-p-toluenesulfonanilide, a red disperse dye is obtained which exhibits similar properties.

Also, similar dyes are obtained by using other coupling components in this example, such as the following:

3'-(N-ethyl-N-cyanoethylamino)-1-butanesulfonanilide,
3'-(bis-2-cyanoethylamino)methanesulfonanilide,
2-chloro-3'-(dipropylamino)benzenesulfonanilide, or
3'-amino-4-nitrobenzenesulfonanilide.

When the 6-acetyl-2-aminobenzothiazole in Examples 7, 8, 9, and 10 is replaced by a chemically equivalent amount of 2-amino-6-benzoylbenzothiazole, dyes of similar fastness properties are obtained.

By following the procedure of Example 1 and employing the diazo and coupling components listed in Table I, bright orange to red-violet dyes are obtained which exhibit good strength and good fastness properties on polyester fibers.

TABLE I

| | Diazo Component | Coupling Component |
|---|---|---|
| (a) | C₂H₅—C(O)—[benzothiazole]—C—NH₂ | [phenyl]—N(C₂H₅)(C₂H₅) |
| (b) | CH₃CH₂CH₂—C(O)—[benzothiazole]—C—NH₂ | [phenyl(CH₃)]—NH—CH₂CH₂OH |
| (c) | CH₃CH₂CH₂CH₂—C(O)—[benzothiazole]—C—NH₂ | [phenyl]—N(CH₂CH₂OH)(CH₂CH₂OH) |
| (d) | [phenyl]—C(O)—[benzothiazole]—C—NH₂ | [phenyl]—N(CH₂CH₂OH)(CH₂CH₂CN) |

TABLE I—Continued

| | Diazo Component | Coupling Component |
|---|---|---|
| (e) | H₃C–⌬–C(=O)–[benzothiazole]–C–NH₂ | 3-CH₃O-C₆H₄–N(CH₂CH₂CN)₂ |
| (f) | CH₃–C(=O)–[benzothiazole]–C–NH₂ | 2-Cl-C₆H₄–NH–CH₂CH₂CN |
| (g) | Same as (f) above | C₆H₅–N(CH₂CH₂O–C(=O)–CH₃)₂ |
| (h) | C₂H₅–C(=O)–[benzothiazole]–C–NH₂ | C₆H₅–N(C₂H₅)(CH₂CH₂O–C(=O)–CH₃) |
| (i) | CH₃–C(=O)–[benzothiazole]–C–NH₂ | 2,6-(OCH₃)₂-C₆H₃–N(CH₂CH₂OH)₂ |
| (j) | C₆H₁₁–C(=O)–[benzothiazole]–C–NH₂ | C₆H₅–N(CH₂CH₂)₂O (morpholino) |
| (k) | CH₃CH₂CH₂–C(=O)–[benzothiazole]–C–NH₂ | C₆H₅–N(CH₂CH₂)₂S (thiomorpholino) |
| (l) | CH₃–C(=O)–[benzothiazole]–C–NH₂ | 3-Cl-C₆H₄–N(CH₃)₂ |
| (m) | Same as (l) above | 2-OC₂H₅-C₆H₄–N(CH₃)(CH₂CH₂CH₂OCH₃) |
| (n) | ....do.... | C₆H₅–N(CH₂CH₂CH₂CH₃)(CH₂CH₂OCH₃) |
| (o) | ....do.... | 2-OC₂H₅-C₆H₄–N(C₂H₅)(CH₂CH₂OC₂H₅) |
| (p) | ....do.... | C₆H₅–N(CH₂CH₂OH)(4-CH₃-C₆H₄) |
| (q) | ....do.... | 2-Br-C₆H₄–N(CH₂CH₂OCH₃)(C₆H₅) |
| (r) | ....do.... | C₆H₅–N(CH₂CH₂–O–C(=O)–CH₃)(C₆H₅) |

TABLE I—Continued

| | Diazo Component | Coupling Component |
|---|---|---|
| (s) | do | C₂H₅ on N-cyclohexyl with two CH₂CH₂O-C(=O)-cyclohexyl groups |
| (t) | do | N-cyclohexyl with CH₂CH₂OCH₃ and CH₂CH₂O-C(=O)-CH₃ |
| (u) | do | N-cyclohexyl with CH₂CH₂CN and CH₂CH₂CH₂OCH₃ |
| (v) | CH₃-C(=O)- benzothiazole-2-NH₂ | cyclohexyl with NH-COCH₃ and N(CH₂CH₂OH)₂ |
| (w) | Same as (v) above | cyclohexyl with NHCOC₄H₉ and N(CH₃)₂ |
| (x) | C₄H₉-C(=O)- benzothiazole-2-NH₂ | cyclohexyl with OCH₃, CH₃, N(C₂H₅)(CH₂CH₂CN) |
| (y) | C₂H₅-C(=O)- benzothiazole-2-NH₂ | cyclohexyl with 2 Cl, N(C₂H₅)(CH₂CH₂OH) |
| (z) | Same as (y) above | cyclohexyl-NH-CH₂CH₂CH₂CH₂OH |
| (aa) | do | cyclohexyl with 2 CH₃, N(CH₃)(CH₂-CH(OH)-CH₂OH) |
| (bb) | (CH₂CH₂)₂CH-C(=O)- benzothiazole-2-NH₂ | cyclohexyl-N(CH₂CH₂OH)(CH₂CH₂CN) |
| (cc) | CH₃-C(=O)- benzothiazole-2-NH₂ | cyclohexyl with C(=O)-NH, OCH₃, N(CH₃)₂ |
| (dd) | C₂H₅-C(=O)- benzothiazole-2-NH₂ | cyclohexyl with C(=O)-NH, NO₂, N(C₂H₅)(CH₂CH₂CN) |
| (ee) | Same as (dd) above | cyclohexyl with CH₃, N(CH₂CH₂CN)(CH₂CH₂O-C(=O)-cyclohexyl-C(=O)-OC₂H₅) |

TABLE I—Continued

| | Diazo Component | Coupling Component |
|---|---|---|
| (ff) | CH₃-CO-[benzothiazole]-C-NH₂ | NC-[phenyl]-C(O)-NH-[cyclohexyl]-N(C₂H₅)-CH₂CH₂O-C(O)-[phenyl]-OCH₃ |
| (gg) | Same as (ff) above | [phenyl]-[phenyl]-C(O)-NH-[cyclohexyl]-N(CH₃)-CH₂CH₂O-C(O)-[phenyl]-NO₂ (O₂N-) |
| (hh) | [phenyl]-CO-[benzothiazole]-C-NH₂ | Cl-[phenyl]-NHC₂H₄CN |
| (ii) | Same as (hh) above | [phenyl](Cl)-NHC₂H₄CN |
| (jj) | O₂N-[phenyl]-CO-[benzothiazole]-C-NH₂ | [phenyl]-N(CH₃)₂ ; NH-C(O)-CH₃ |
| (kk) | Same as (jj) above | [phenyl]-N(CH₃)₂ ; NH-C(O)-C₆H₅ |
| (ll) | do | [phenyl]-N(C₂H₄OC(O)CH₃)₂ |
| (mm) | do | [phenyl]-NH₂ ; NH-C(O)-CH₃ |
| (nn) | do | [phenyl]-NH₂ ; NH-C(O)-C₆H₅ |
| (oo) | [phenyl]-CO-[benzothiazole]-C-NH₂ | [phenyl]-N(C₂H₅)(C₂H₄CN) ; NH-C(O)-CH₃ |
| (pp) | Same as (oo) above | [phenyl]-N(CH₃)-[phenyl] |
| (qq) | NO₂-[phenyl]-CO-[benzothiazole]-C-NH₂ | [phenyl]-N(CH₃)₂ |
| (rr) | Same as (qq) above | [phenyl]-N(C₂H₅)(C₂H₄OC(O)-[phenyl]-C(O)-OC₂H₅) |

TABLE I—Continued

| | Diazo Component | Coupling Component |
|---|---|---|
| (ss) | ......do...... | 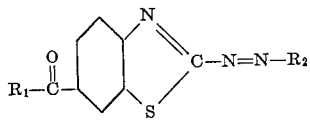 |
| (tt) | 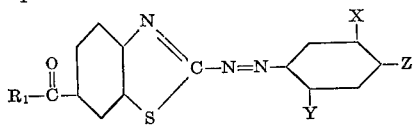 | 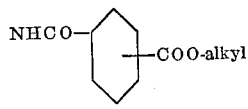 |

The disperse dyes of this invention can also be used in dyeing hydrophobic fibers other than those of the polyester type; for example, cellulose acetate, cellulose triacetate, and polyamide fibers such as nylon.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. The disperse azo dye of formula wherein $R_1$ is selected from the group consisting of cyclohexyl radicals and phenyl radicals which may be substituted with Cl, Br, $NO_2$ or $C_1$–$C_4$ alkyl; $R_2$ is a radical of an azo coupling component selected from the group consisting of phenolic, naphtholic, enolic, aromatic amine of the benzene series, aromatic amine of the naphthalene series, and heterocyclic couplers, said $R_2$ radical being free of ionogenic water-solubilizing sulfo and carboxy groups.

2. A disperse azo dye of the formula wherein $R_1$ is selected from the group consisting of phenyl, tolyl and cyclohexyl radicals; X is selected from the group consisting of H, Cl, $OCH_3$, and $OC_2H_5$; Y is selected from the group consisting of H, Cl, Br, $CH_3$, $C_2H_5$, $OCH_3$, $OC_2H_5$, NHCO-alkyl, $NHSO_2$-alkyl, NHCO-phenyl, and $NHSO_2$-phenyl, in which said phenyl radicals may be substituted by Cl, $NO_2$, CN, $OCH_3$, phenyl or alkyl, and wherein the alkyls contain 1 to 4 C-atoms; and Z is selected from the group consisting of morpholine, thiomorpholine, thiomorpholine-dioxide and —N($R_3$)$R_4$ where $R_3$ is selected from the group consisting of H, $C_1$–$C_4$ alkyl, $C_2$–$C_4$ hydroxyalkyl, 2-cyanoethyl, alkoxyalkyl having 3 to 4 C-atoms, 2-acetoxyethyl, and 2-benzoyloxyethyl; and $R_4$ is selected from the group consisting of H, $C_1$–$C_4$ alkyl, $C_2$–$C_4$ hydroxyalkyl, 2-cyanoethyl, alkoxyalkyl having 3 to 4 C-atoms, 2-acetoxyethyl, 2-benzolyoxyethyl, phenyl, tolyl, and substituted 2-benzoyloxyethyl in which the benzoyl radical may be substituted by a radical selected from the group consisting of Cl, $NO_2$, CN, $OCH_3$, phenyl, $C_1$–$C_4$ alkyl, and COO-alkyl wherein said ester alkyl contains 1 to 4 C-atoms.

3. The disperse azo dye of formula

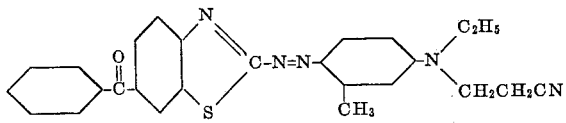

4. The disperse azo dye of formula

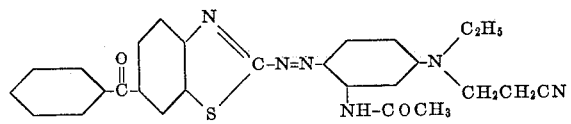

References Cited

UNITED STATES PATENTS

| | | | |
|---|---|---|---|
| 2,149,051 | 2/1939 | Helberger et al. | 260—158 X |
| 2,785,157 | 3/1957 | Straley et al. | 260—158 |
| 2,857,371 | 10/1958 | Straley et al. | 260—158 X |
| 2,891,942 | 6/1959 | Merian | 260—158 X |
| 3,007,915 | 11/1961 | Merian | 260—158 |
| 3,099,652 | 7/1963 | Straley et al. | 260—158 X |

FOREIGN PATENTS 774,611  5/1957  Great Britain.

OTHER REFERENCES

Ricci et al.: C. A., vol. 150, pp. 5563–5564 (1956).

CHARLES B. PARKER, *Primary Examiner.*

FLOYD D. HIGEL, *Assistant Examiner.*